US012679377B2

(12) United States Patent
Jo et al.

(10) Patent No.: US 12,679,377 B2
(45) Date of Patent: Jul. 14, 2026

(54) METHOD AND SYSTEM FOR GENERATING LANE CHANGING TRAJECTORY OF VEHICLE

(71) Applicant: HL KLEMOVE CORP., Incheon (KR)

(72) Inventors: Eunsan Jo, Incheon (KR); Hanshin Cho, Incheon (KR); Daichang Ro, Incheon (KR); Seungmok Song, Incheon (KR); Junhyung Cha, Incheon (KR); Dayeon Seo, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 60 days.

(21) Appl. No.: 18/785,594

(22) Filed: Jul. 26, 2024

(65) Prior Publication Data

US 2025/0187600 A1     Jun. 12, 2025

(30) Foreign Application Priority Data

Dec. 12, 2023   (KR) ........................ 10-2023-0179336

(51) Int. Cl.
*B60W 30/18*       (2012.01)
*B60W 30/09*       (2012.01)

(52) U.S. Cl.
CPC ...... *B60W 30/18163* (2013.01); *B60W 30/09* (2013.01); *B60W 2420/403* (2013.01); *B60W 2420/408* (2024.01); *B60W 2520/12* (2013.01); *B60W 2552/10* (2020.02); *B60W 2554/4041* (2020.02)

(58) Field of Classification Search
CPC .......... B60W 30/18163; B60W 30/09; B60W 2520/12; B60W 60/0015; B60W 30/08; B60W 2720/12; B60Y 2300/18166
See application file for complete search history.

(56) References Cited

U.S. PATENT DOCUMENTS

| | | | |
|---|---|---|---|
| 10,259,458 B2 * | 4/2019 | Yoo ................ | B60W 30/18163 |
| 2009/0212930 A1 * | 8/2009 | Pfeiffer .................. | G08G 1/167 |
| | | | 701/41 |
| 2017/0320500 A1 * | 11/2017 | Yoo ................... | B60W 30/0956 |

FOREIGN PATENT DOCUMENTS

| | | | | |
|---|---|---|---|---|
| DE | 19526452 C1 * | 10/1996 | ............. | B60Q 9/008 |
| KR | 10-2007-0105386 | 10/2007 | | |
| KR | 10-2016-0095747 | 8/2016 | | |
| KR | 20160095747 A * | 8/2016 | ............ | B60W 10/20 |

OTHER PUBLICATIONS

Machine Translation of Hyung's reference (KR-20160095747-A) (Year: 2016).*
Machine Translation of Horst's reference (DE-19526452-C1) (Year: 1996).*
Office Action dated Jul. 24, 2025 for Korean Patent Application No. 10-2023-0179336 and its English translation provided by Applicant's foreign counsel.

* cited by examiner

*Primary Examiner* — Tarek Elarabi
(74) *Attorney, Agent, or Firm* — WOMBLE BOND DICKINSON (US) LLP

(57) ABSTRACT

A method and a system for generating a lane changing trajectory of a vehicle are provided, and the method for generating the lane changing trajectory of the vehicle according to an embodiment of the present disclosure comprises: executing a lane changing function of the vehicle; calculating a collision risk with a peripheral vehicle; and generating a lane changing trajectory such that a lateral speed of the vehicle at a start of the lane change changes according to the collision risk.

15 Claims, 9 Drawing Sheets

(a)

(b)

(c)

Prior Art

Figure 2:
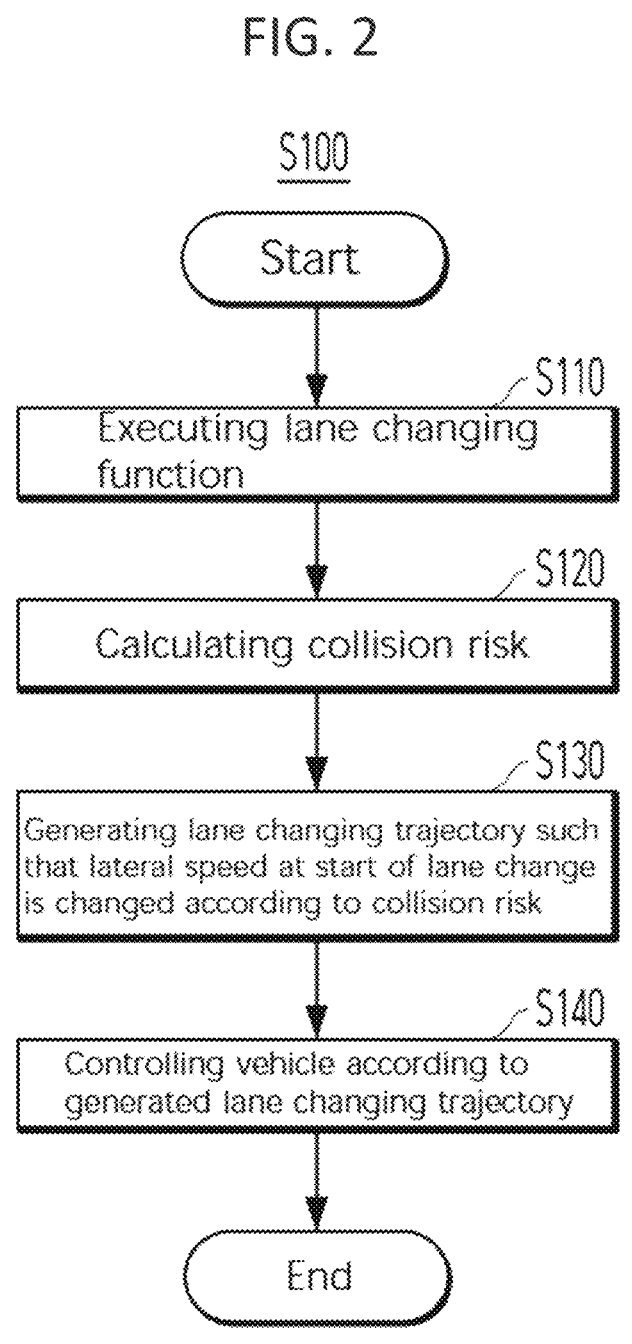

Start

S110
Executing lane changing function

S120
Calculating collision risk

S130
Generating lane changing trajectory such that lateral speed at start of lane change is changed according to collision risk S140
Controlling vehicle according to generated lane changing trajectory End

100

METHOD AND SYSTEM FOR GENERATING LANE CHANGING TRAJECTORY OF VEHICLE

CROSS-REFERENCE TO RELATED APPLICATION

This application claims the benefit of and priority to Korean Patent Application No. 2023-0179336 filed on Dec. 12, 2023, the entire disclosures of which are incorporated herein by reference.

TECHNICAL FIELD

The present disclosure relates to a method and system for generating a lane changing trajectory of a vehicle. More specifically, the present disclosure relates to a method and system for generating a lane changing trajectory of the vehicle that allows the vehicle to generate an optimal lane changing trajectory by adapting to the surrounding environment when changing the driving lane.

BACKGROUND

In a vehicle, a driver assistance system provides assistance to the driver while driving in the vehicle for the driver's convenience. In the driver assistance system, the lane changing function provides a driver assistance method to safely change the driving lane in situations where the driver wants to change lanes.

In this regard, situations arise where the driving lane needs to be changed on highway entrances and exits, etc., and the need for a lane changing function is increasing in order to move to the desired destination in such a driving environment. In particular, many lane change attempts are required even in environments with high uncertainty, for example, environments with a lot of vehicles with low driving speeds.

In performing this lane changing assistance function, it is necessary to comply with the standards of international regulations regarding the Automatically Commanded Steering Function (ACSF). According to the ACSF international regulations on lane change (ACSF C), the lane change must be completed within a certain period of time (for example, 10 seconds) after receiving the driver's command.

In order to meet these standards, according to the prior art, it was common to generate a lane changing route by making the lateral speed at the start of the lane change and the lateral speed at the end of the lane change the same.

In the lane changing assistance function of a vehicle, there is a need for a method and system for generating a lane changing trajectory that can ensure rapid lane change while ensuring safety even in case that the lane change fails.

SUMMARY

The present disclosure is to solve the above-mentioned problems of the prior art, and the object of the present disclosure is to provide a method and system for generating lane changing trajectory that generates different lane changing trajectories based on the risk of collision with peripheral vehicles when changing the driving lane.

In addition, the object of the present disclosure is to provide a method and system for generating lane changing trajectory that can improve driving convenience for drivers while complying with the standards of international regulations with respect to lane changing.

However, the technical problem to be achieved by the embodiments of the present disclosure is not limited to the technical problems described above, and other technical problems may exist.

As a technical means for achieving the above technical problem, a method for generating a lane changing trajectory of a vehicle according to an embodiment of the present disclosure comprises: executing a lane changing function of the vehicle; calculating a collision risk with a peripheral vehicle; and generating a lane changing trajectory such that a lateral speed of the vehicle at a start of the lane change changes according to the collision risk.

Further, the generating of the lane changing trajectory may further comprise: determining whether the collision risk exceeds a predetermined first threshold value; and if the collision risk exceeds the first threshold value, generating the lane changing trajectory such that the lateral speed of the vehicle at the start of the lane change is smaller than a predetermined lateral speed Further, if the collision risk is equal to or less than the first threshold value, the lane changing trajectory may be generated such that the lateral speed of the vehicle at the start of the lane change is greater than the predetermined lateral speed.

Further, the lane changing trajectory may be generated such that based on a mid time point of the lane change from a starting time point to an ending time point of the lane change, a graph of a lateral speed of the vehicle over time before the mid time point may be to be asymmetrical with a graph of a lateral speed of the vehicle over time after the mid time point.

Further, in the generating of the lane changing trajectory, the lane changing trajectory may be generated based on a spline curve using two 5th degree polynomials.

The method for generating the lane changing trajectory of the vehicle may further comprise controlling the vehicle to drive along the generated lane changing trajectory, after the generating of the lane changing trajectory.

Further, the executing of the lane changing function may be performed by operating a lane changing button installed at the vehicle, and the lane changing trajectory may be generated such that the vehicle moves continuously without stopping in a lateral direction from a time point of operating the lane changing button to a time point when the lane change is completed.

Further, the generating of the lane changing trajectory may comprise generating the lane changing trajectory such that the lane change is completed within a first predetermined time from the time point of operating the lane changing button.

Further, the generating of the lane changing trajectory may comprise generating the lane changing trajectory such that the vehicle overlaps with one lane line of a neighboring lane within a second predetermined time from the time point of operating the lane changing button, and the lane change may be completed within a third predetermined time from a time point when the overlapping with the one lane line begins.

The method for generating the lane changing trajectory of the vehicle may further comprise: after controlling of the vehicle, recalculating the collision risk with the peripheral vehicle; generating a lane returning trajectory of the vehicle if the collision risk with the peripheral vehicle exceeds a predetermined second threshold value by comparing the recalculated collision risk with the second threshold value; and a controlling the vehicle to return to an existing lane according to the generated lane return returning trajectory.

A system for generating a lane changing trajectory of a vehicle according to an embodiment of the present disclosure comprises: a sensor configured to detect surroundings of the vehicle; a vehicle information detector configured to detect body information of the vehicle; a lane changing button configured to execute a lane changing function of the vehicle; and a controller configured to control the vehicle by generating the lane changing trajectory of the vehicle, wherein the controller is configured to calculate a collision risk between the vehicle and a peripheral vehicle when the lane changing button is operated, and to generate the lane changing trajectory such that a lateral speed of the vehicle at a start of a lane change changes according to the collision risk.

Further, the controller may be configured to determine whether the collision risk exceeds a predetermined first threshold value, and to generate the lane changing trajectory such that the lateral speed of the vehicle at the start of the lane change is smaller than a predetermined lateral speed if the collision risk exceeds the first threshold value.

Further, the controller may be configured to generate the lane changing trajectory such that the lateral speed of the vehicle at the start of the lane change is greater than the predetermined lateral speed if the collision risk is equal to or less than the first threshold value.

Further, the sensor may comprise at least one of a front camera, a front radar, or a corner radar installed at the vehicle.

Further, the peripheral vehicle may be a vehicle approaching from a rear side of a neighboring lane adjacent to a lane in which the vehicle is driving, and the controller may be configured to calculate the collision risk between the vehicle and the peripheral vehicle from information obtained by the sensor and the vehicle information detector.

Further, the controller may be configured to generate the lane changing trajectory such that the lane change is completed within a first predetermined time from a time point of operating the lane changing button.

The system for generating the lane changing trajectory of the vehicle may further comprise an acceleration apparatus, a braking apparatus, and a steering apparatus, and the controller may be configured to control the vehicle according to the generated lane changing trajectory by controlling at least one of the acceleration apparatus, the braking apparatus, or the steering apparatus.

A method for generating a lane changing trajectory of a vehicle according to another embodiment of the present disclosure comprises: executing a lane changing function of the vehicle; calculating a collision risk with a peripheral vehicle; and generating a lane changing trajectory such that a heading angle of the vehicle at a start of a lane change changes according to the collision risk.

Further, the generating of the lane changing trajectory may further comprise determining whether the collision risk exceeds a predetermined first threshold value, and if the collision risk exceeds the first threshold value, the lane changing trajectory may be generated such that the heading angle of the vehicle at the start of the lane change is smaller than a predetermined heading angle.

Further, if the collision risk is equal to or less than the first threshold value, the lane changing trajectory may be generated such that the heading angle of the vehicle at the start of the lane change is greater than the predetermined heading angle.

The above-described means for solving the problem is only exemplary and should not be construed as limiting the present disclosure. In addition to the exemplary embodiments described above, additional embodiments may exist in the drawings and the following detailed description of the present disclosure.

According to certain embodiments of the present disclosure, it is possible to provide a method and system for generating a lane changing trajectory that enable the lane change with an optimal trajectory by varying the lane changing trajectory depending upon the collision risk with peripheral vehicles when executing the lane changing function.

In addition, according to the embodiments of the present disclosure, it is possible to provide a method and system for generating a lane changing trajectory that can promote driver safety and driving convenience while complying with international regulation standards regarding the lane changing function.

However, the effects obtainable from the present disclosure are not limited to the effects described above, and other effects may exist.

BRIEF DESCRIPTION OF THE DRAWINGS

FIG. 2 is a control flowchart of a method for generating a lane changing trajectory of a vehicle according to an embodiment of the present disclosure.

DETAILED DESCRIPTION

Figure 1:
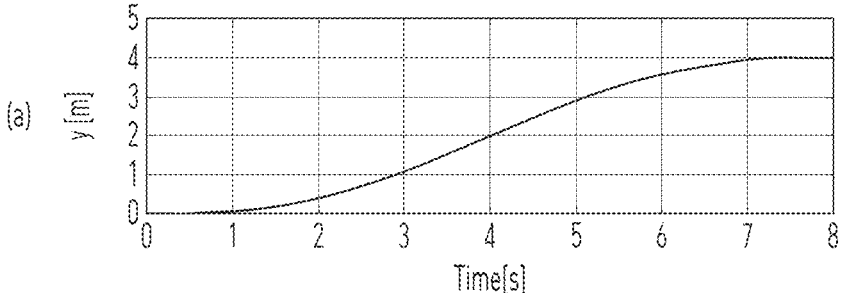
FIG. 1 illustrates graphs showing data of a lane changing trajectory of a vehicle in a lane changing assistance function according to the prior art.
Figure 1:
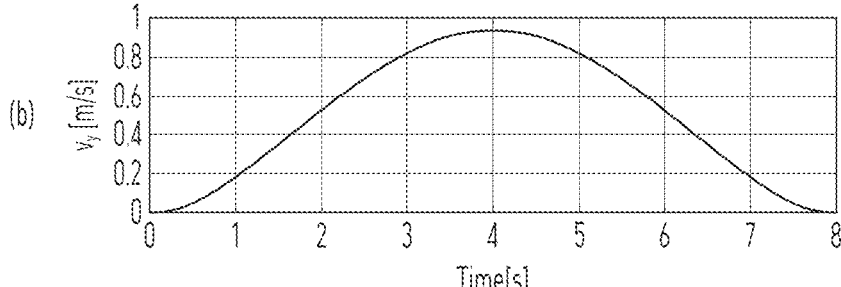
Figure 1:
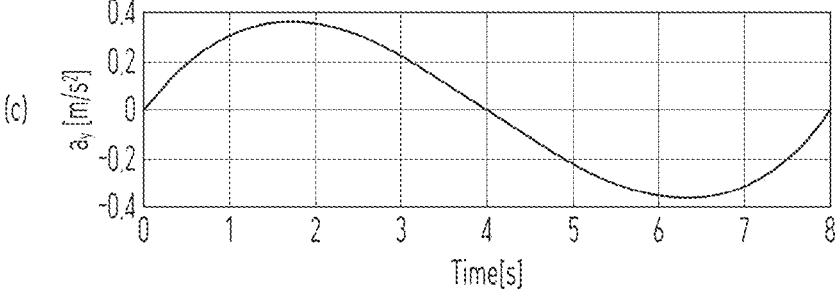

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for generating a lane changing trajectory that enable to generate an optimal lane changing trajectory by adapting to the surrounding environment in which the vehicle is driving.

FIG. 1 illustrates graphs showing data of a lane changing trajectory of a vehicle in a lane changing assistance function according to the prior art.

In this regard, in the conventional lane changing function, as shown in FIG. 1(a), for example, when the lane change is completed at a distance of 4 m in the lateral direction from the starting position, the graph has a symmetrical shape about a point where the lateral movement distance is 2 m, and as shown in FIG. 1(b), the lateral speed $v_y$ of the vehicle is controlled to be the same at the start and at the end of the lane change.

In other words, the lane changing trajectory graph formed according to the conventional lane changing assistance method is point-symmetrical about the midpoint of the lane change in terms of the lateral movement distance y over time (see FIG. 1(a)), and in terms of lateral speed $v_y$ over time, the graph becomes line-symmetrical about the midpoint of the lane change (see FIG. 1(b)).

Additionally, in terms of the vehicle's lateral acceleration ay over time, the graph becomes point-symmetrical about the midpoint of the lane change (see FIG. 1(c)).

Figure 3:
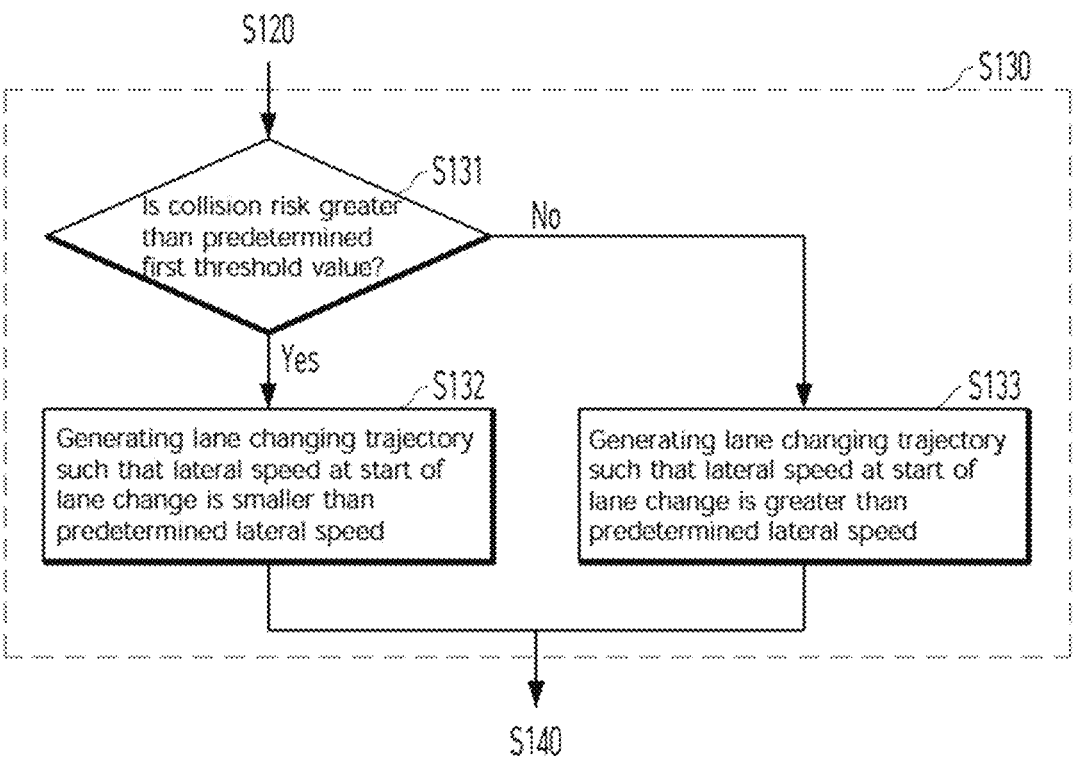
FIG. 3 is a control flowchart illustrating in more detail the generating of the lane changing trajectory in the method for generating the lane changing trajectory of the vehicle according to the embodiment of the present disclosure.

FIG. 2 is a control flowchart of a method for generating a lane changing trajectory of a vehicle according to an embodiment of the present disclosure, and FIG. 3 is a control flowchart illustrating in more detail the generating of the lane changing trajectory in the method for generating the lane changing trajectory of the vehicle according to the embodiment of the present disclosure.

First, referring to FIG. 2 of the present disclosure, the method for generating the lane changing trajectory S100 according to the embodiment of the present disclosure may include a lane changing function execution step S110.

This lane changing function may be a function to assist in changing the lane of the vehicle based on the driver's intention to change the lane, and may be executed, for example, by operating the lane changing button installed in the vehicle.

Next, the method for generating the lane changing trajectory according to the embodiment of the present disclosure may include a collision risk calculation step S120 in which the collision risk between the driving vehicle and a peripheral is calculated.

Here, 'a peripheral' may refer to a vehicle driving in a neighboring lane where the driving vehicle is about to change the lane. More specifically, the peripheral may be a vehicle approaching from the rear side (rear left or rear right side) of the driving lane which is likely to collide with the driving vehicle when the driving vehicle changes the lane.

In other words, calculating the collision risk in the collision risk calculation step S120 is to generate a lane changing trajectory by reflecting the calculated collision risk when changing the lane, since there may be collision risk with a vehicle approaching from the rear side when the driving vehicle changes the lane to the neighboring lane.

Specifically, the collision risk between the driving vehicle and the peripheral may be calculated based on the expected time to collision (TTC) between the driving vehicle and the peripheral. Alternatively, the collision risk may be calculated based on a probabilistic collision risk model based on Responsibility-Sensitive Safety (RSS). However, the present disclosure is not limited thereto, and other methods may be used as long as they can calculate the collision risk between the driving vehicle and the peripheral.

Next, a lane changing trajectory generation step S130 may be performed in which a lane changing trajectory is generated such that the lateral speed at the start of the lane change is changed according to the calculated collision risk. That is, in the lane changing trajectory generation step S130, based on the collision risk between the driving vehicle and the peripheral, in each case that the collision risk is high or the collision risk is low, the lateral speed at the start of the lane change for each lane changing trajectory may be varied.

Looking at the lane changing trajectory generation step S130 in more detail with reference to FIG. 3, first, a collision risk determination step S131 may be performed to determine whether the calculated collision risk exceeds a predetermined first threshold value.

Here, the first threshold value may be a value that can be arbitrarily determined. For example, when calculating the collision risk using a probabilistic collision risk model, a collision risk of 10% may be set as the first threshold value.

Meanwhile, in the collision risk determination step S131, if the collision risk with the peripheral exceeds the predetermined first threshold value ('Yes' in S131), a lane changing trajectory may be generated such that the lateral speed of the vehicle at the start of the lane change is smaller than a predetermined lateral speed (S132).

On the other hand, if the collision risk with the peripheral does not exceed the first predetermined threshold value ('No' in S131), a lane changing trajectory may be generated such that the lateral speed of the vehicle at the start of the lane change is greater than the predetermined lateral speed (S133).

Here, 'the predetermined lateral speed' may refer to a lateral speed of the vehicle at the start of the lane change (initial lateral speed of the lane change) in a lane changing trajectory that the graph of the lateral movement distance or the lateral speed (or the lateral acceleration) over time from the start to the end of the lane change is to be symmetric (point-symmetric or line-symmetric) when the lane changing function is executed.

On the other hand, each of the lane changing trajectory that the lateral speed of the vehicle at the start of the lane change is greater than the predetermined lateral speed, and the lane changing trajectory that the lateral speed of the vehicle at the start of the lane change is smaller than the predetermined lateral speed as in the embodiments of the present disclosure may be a lane changing trajectory that the graph of the lateral movement distance or the lateral speed (or the lateral acceleration) over time from the start to the end of the lane change is to be asymmetric.

The lane changing trajectory generated according to the embodiment of the present disclosure will be explained in more detail in the descriptions of FIGS. 5 and 6.

After the lane changing trajectory is generated in the lane changing trajectory generation step S130, a vehicle control step S140 may be performed in which the vehicle is controlled to drive according to the generated lane changing trajectory.

As discussed above, according to the embodiment of the present disclosure, when the driving vehicle is about to change the lane, a lane changing trajectory may be generated that varies the lateral speed at the start of the lane change based on the collision risk with the peripheral.

Accordingly, if the collision risk with the peripheral is relatively small (if the collision risk is equal to or less than the first threshold value), it is possible to improve the driving responsiveness and the operability by rapidly entering the neighboring lane by increasing the lateral speed at the start of the lane change.

In addition, when the collision risk with the peripheral is relatively high (when the collision risk is greater than the first threshold value), the lateral speed at the start of lane change may be reduced and the entry into the neighboring lane may be performed relatively late. Accordingly, it is possible to safely change the lane by exposing the lane changing intention to the peripheral for a long time (increasing the time for the peripheral to recognize the illuminated turn signal lamp of the driving vehicle).

Meanwhile, if the peripheral of the rear side (rear left of rear right side) increases the speed while the vehicle is driving to change the lane according to the lane changing trajectory generated in the lane changing trajectory generation step S130, the collision risk may increase. In this case, since continuing to change the lane may result in a collision with the peripheral, a situation may arise where the vehicle needs to stop changing the lane and return to the existing lane.

Figure 4:
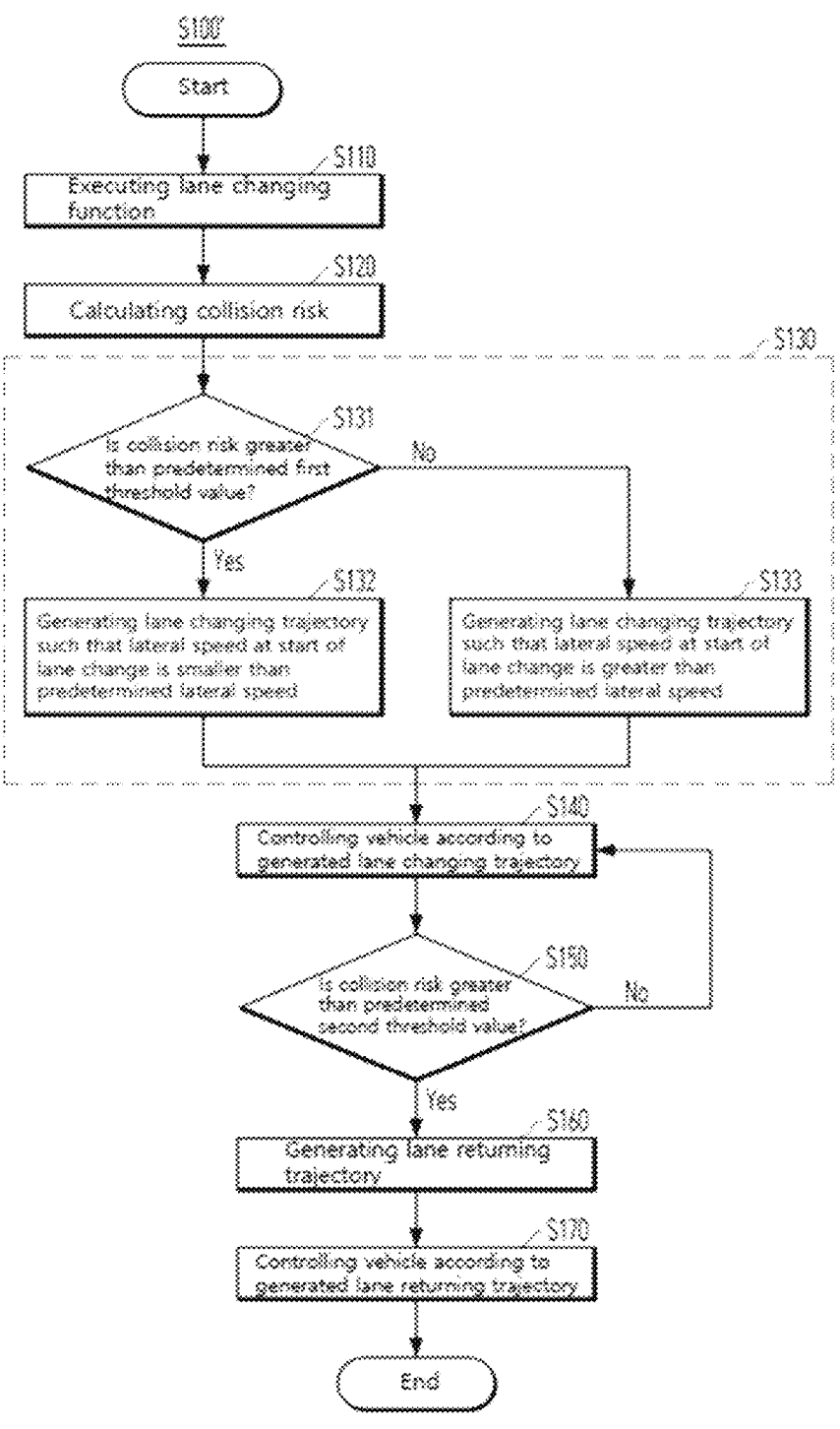
FIG. 4 is a control flowchart of a method for generating a lane change trajectory of a vehicle according to an embodiment of the present disclosure, showing a case of returning to the existing lane according to a driving risk during the lane change.

FIG. 4 is a control flowchart of a method for generating a lane change trajectory of a vehicle according to an embodiment of the present disclosure, showing a case of returning to the existing lane according to a driving risk during the lane change.

Specifically, after the vehicle control step S140 for controlling the vehicle according to the lane changing trajectory generated in the lane changing trajectory generating step S130 is performed, determining whether the collision risk with the peripheral exceeds a predetermined second threshold value S150 may be performed.

Here, the second threshold value may be a value greater than the first threshold value. That is, if the collision risk exceeds the first threshold value, a lane changing trajectory is generated such that the lateral speed is small, and if the collision risk exceeds the second threshold value which is greater than the first threshold value, the vehicle may be controlled to return to the existing lane since it is determined that there is a high risk to collide with the peripheral if the vehicle continues to drive according to the generated lane changing trajectory. Meanwhile, the second threshold value may be an arbitrary set value like the first threshold value. For example, in case that the collision risk is calculated using a probabilistic collision risk model, a collision risk of 30% may be set as the second threshold value.

If the collision risk with the peripheral exceeds the second threshold value ('Yes' in S150), the lane returning trajectory generation step S160 for generating a lane returning trajectory may be performed, and a step of controlling the vehicle S170 for controlling the vehicle according to the generated returning trajectory may be performed.

Meanwhile, if the collision risk with the peripheral does not exceed the second threshold value ('No' in S150), the vehicle may be controlled to change the lane according to the previously generated lane changing trajectory (S140).

In this regard, according to the prior art, since the lane changing trajectory in the form of a symmetrical graph is generated regardless of the collision risk with the peripheral, in cases that it is necessary to return to the existing lane due to the collision risk with the peripheral, the driver may feel uncomfortable by generating an unstable lane returning trajectory due to a sudden direction change. In addition, there may be a problem in that the vehicle may have already entered the neighboring lane at the timing of determining whether to return to the existing lane, which may further increase the collision risk with peripheral.

On the other hand, according to method for generating the lane changing trajectory S100' of an embodiment of the present disclosure, if there is a collision risk with the peripheral (i.e., if the collision risk exceeds the first threshold value), by making the lateral speed at the start of the lane change smaller than the predetermined lateral speed (the lateral speed of the vehicle according to the symmetrical graph), it is possible to generate the returning trajectory as a safer trajectory in case that the vehicle is required to return to the existing lane when the collision risk is increased during the lane change (the collision risk exceeds the second threshold value). In addition, since the initial lateral speed is reduced and the entry into the neighboring lane is performed relatively late, the vehicle can be controlled to return before entering the neighboring lane, thereby reducing the collision risk with the peripheral.

Figure 5:
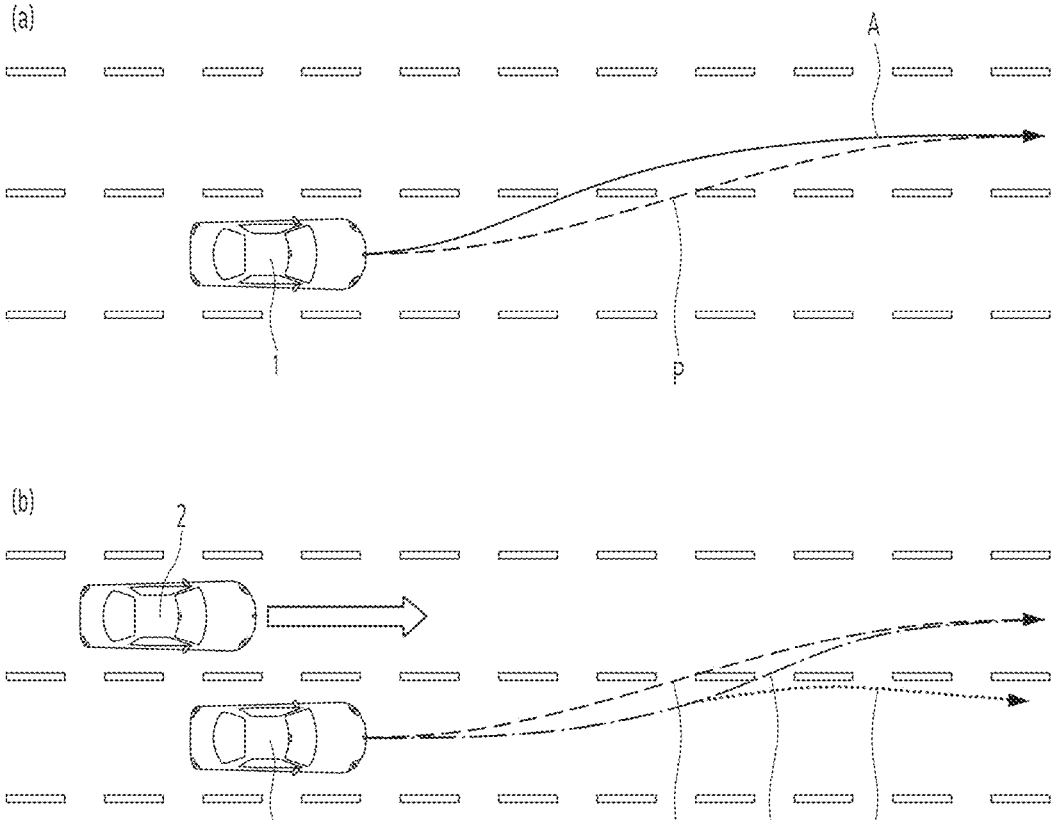
FIG. 5 illustrates diagrams showing trajectories in which the vehicle changes the lane according to the driving risk in the method for generating the lane changing trajectory of the vehicle according to the embodiment of the present disclosure.

FIG. 5 illustrates diagrams showing trajectories in which the vehicle changes the lane according to the driving risk in the method for generating the lane changing trajectory of the vehicle according to the embodiment of the present disclosure.

In FIG. 5, if the driver executes the lane changing function to change the lane while the vehicle 1 is driving, it is determined whether the collision risk with the peripheral exceeds the first predetermined threshold value.

As shown in FIG. 5(*a*), if the collision risk with the peripheral does not exceed the predetermined first threshold value, such as in case that there is no peripheral, the vehicle 1 may generate a lane changing trajectory A having an initial lateral speed greater than the lateral speed at the start of the lane change in the lane changing trajectory P (the predetermined lateral speed) in which the graph of data is to be symmetric.

On the other hand, as shown in FIG. 5(*b*), if the peripheral 2 driving in the neighboring lane where the vehicle 1 is about to cut in exists within a predetermined distance to the rear side (rear left or rear right side) of the vehicle 1, the collision risk with the peripheral 2 may exceed the first threshold value. In this case, the vehicle 1 may generate a lane changing trajectory B having an initial lateral speed smaller than the lateral speed at the start of the lane change in the lane change trajectory P (predetermined lateral speed) in which the graph of data regarding the lane changing trajectory is to be symmetric.

Meanwhile, in FIG. 5(*b*), while the vehicle 1 is driving along the lane changing trajectory B, if the peripheral 2 accelerates so that the collision risk exceeds the second threshold value, the vehicle 1 may return to the existing lane by generating the lane returning trajectory R. In this case, according to the trajectory B, since the initial entry speed (e.g., initial lateral speed) is smaller than that of the lane changing trajectory P so that it is possible to generate a gradual returning trajectory, the driver's safety and driving convenience can be improved.

Figure 6:
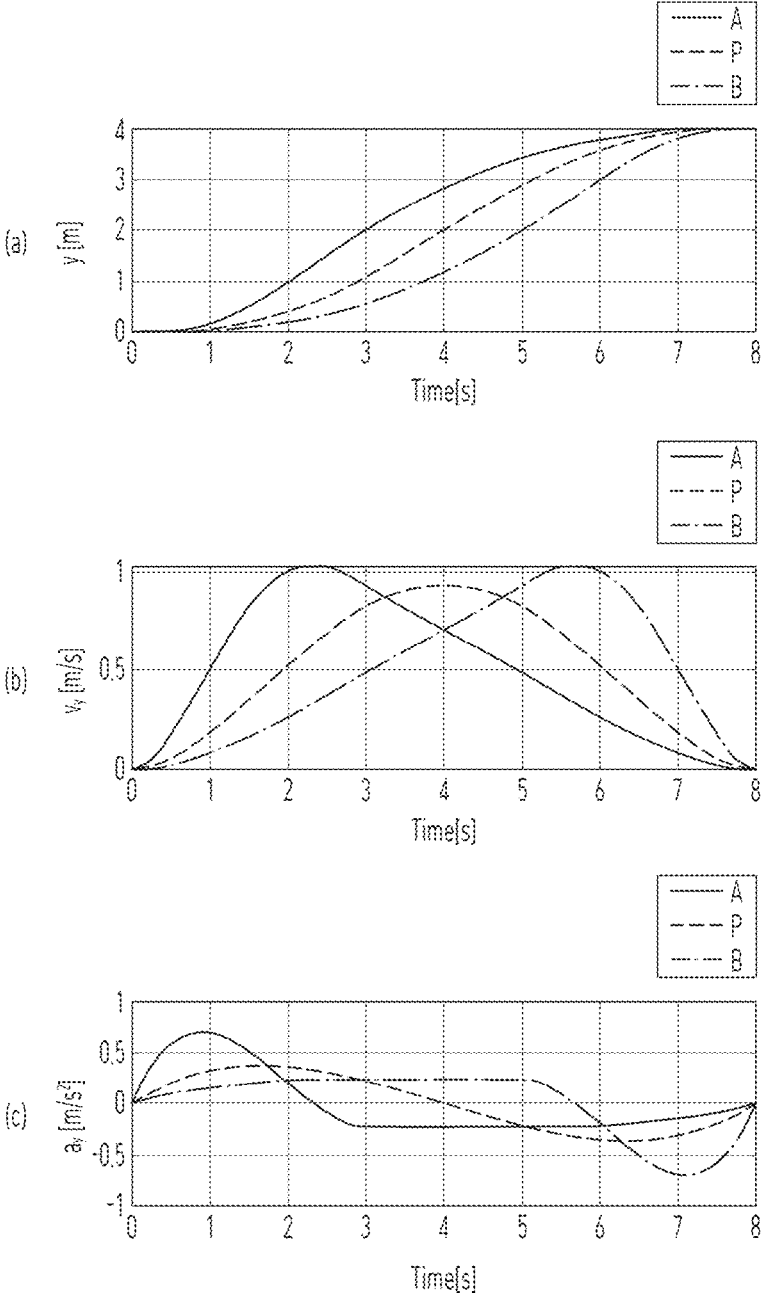
FIG. 6 illustrates graphs showing changes in a lateral movement distance, a lateral speed, and a lateral acceleration of the vehicle over time when the vehicle changes the lane according to the method for generating the lane changing trajectory of the present disclosure.

FIG. 6 illustrates graphs showing changes in a lateral movement distance, a lateral speed, and a lateral acceleration of the vehicle over time when the vehicle changes the lane according to the method for generating the lane changing trajectory of the present disclosure.

In the embodiment of FIG. 6, in the case of following the lane changing trajectory generated by the lane changing trajectory generation method according to the embodiment of the present disclosure, it is exemplified so that the lane change is completed when the vehicle moves 4 m in the lateral distance, and the lane change is completed within 8 seconds (the first predetermined time) from the start of the lane change. However, the present disclosure is not limited thereto, and if the regulations on the lane changing function (ACSF) are complied, the total lateral movement distance and total lane changing time from the start to the completion of the lane change may be set differently.

Meanwhile, in FIG. 6, the graph shown with a dotted line represents a conventional lane changing trajectory (trajectory P) that is set so that the graph of the lane changing data is symmetric, and the graph shown with a solid line represents a lane changing trajectory (trajectory A) with a large initial lateral speed when the collision risk is equal to or less than the first threshold value in the embodiment of the present disclosure. In addition, the graph shown with a dashed-dotted line represents a lane changing trajectory (trajectory B) with the initial lateral speed set to be small when the collision risk is greater than the first threshold value in the embodiment of the present disclosure.

Looking at the graph regarding the lateral movement distance y over time with reference to FIG. 6(*a*), in case that the collision risk is equal to or less than the first threshold value in the lane changing trajectory generation method according to the embodiment of the present disclosure, the vehicle may pass the midpoint of the lane change (the lateral movement distance of 2 m) at the timing that approximately 3 seconds (the second predetermined time) has elapsed. In other words, when approximately 3 seconds have elapsed, the entry into the neighboring lane (a part of the driving vehicle overlaps with one lane line of the neighboring lane) may occur.

On the other hand, in case that the collision risk exceeds the first threshold value, the second predetermined time may be approximately 5 seconds. In other words, the vehicle may pass the midpoint of the lane change (the lateral movement distance of 2 m) after approximately 5 seconds. In this way, if the collision risk is relatively high, the entry into the neighboring lane (a part of the driving vehicle overlapping with one lane line of the neighboring lane) may occur at relatively late timing from the start of the lane change.

FIG. 6(*b*) is a graph showing data on the lateral speed $v_y$ from the start to the end of the lane change. As shown in FIG. 6(*b*), in the case of a graph of lateral speed data where the collision risk is equal to or less than the first threshold value (trajectory A), a lane changing trajectory may be generated with a relatively large lateral speed at the start of the lane change. On the other hand, a graph may be formed such that the lateral speed gradually decreases after reaching the maximum lateral speed.

In the case of a graph where the collision risk is greater than the first threshold value (trajectory B), since a lane changing trajectory is generated with a relatively small lateral speed at the start of the lane change, it may take longer to reach the maximum lateral speed. On the other hand, after reaching the maximum lateral speed, a graph may be formed such that the lateral speed decreases relatively rapidly.

FIG. 6(*c*) is a graph showing data on the lateral acceleration ay of the vehicle from the start to the end of the lane change. As shown in FIG. 6(*c*), according to the lane changing trajectory according to the prior art, it has a point symmetrical form about the midpoint (4 seconds point), while the graph where the collision risk is equal to or less than the first threshold value (trajectory A), the absolute value of the lateral acceleration at the initial stage of the lane change increases, and in the graph where the collision risk is greater than the first threshold value (trajectory B), the absolute value of the lateral acceleration at the final stage of the lane change increases.

As shown in the embodiments of FIG. 6(*a*) to FIG. 6(*c*), the lane changing trajectory generated according to the embodiment of the present disclosure may have a shape that, based on the midpoint of the lane change (the 4 seconds point in the graph) from the start point (starting time point) to the end point (the ending time point) of the lane change, each of the graphs of the vehicle's lateral movement distance, the lateral speed, and the lateral acceleration over time before the midpoint and each of the graphs of the vehicle's lateral movement distance, the lateral speed, and the lateral acceleration after the midpoint is asymmetric.

Meanwhile, in the embodiment of FIG. 6, the second predetermined time (from the start of lane change to the start of the entry into the neighboring lane) is exemplified as 3 seconds and 5 seconds depending on the collision risk, but the present disclosure is not limited thereto. The second predetermined time in the trajectory A and in the trajectory B may be set differently, as long as the conditions that the entry time point into the neighboring lane in the trajectory A is earlier than that in the trajectory P and the entry time point into the neighboring lane in the trajectory B is later than that in the trajectory P are satisfied.

Further, the time from the entry time point into the neighboring lane to the time point that the lane change is completed may be set as a third predetermined time. That is, the first predetermined time (the time from the start of lane change to the end of the lane change) may be the sum of the second predetermined time and the third predetermined time.

In the embodiment of FIG. 6, since the first predetermined time is illustrated as 8 seconds, in case of the trajectory A (if the second predetermined time is 3 seconds), the third predetermined time may be 5 seconds, and in case of the trajectory B (if the second predetermined time is 5 seconds), the third predetermined time may be 3 seconds.

Meanwhile, the embodiment of FIG. 6 illustrates that the first predetermined time is 8 seconds, but as long as the regulations regarding the lane changing function are to be complied (for example, the lane change must be completed within 10 seconds), the first predetermined time may be set differently. Meanwhile, according to the standards of the regulations regarding the lane changing function, in the embodiments of the present disclosure, the second predetermined time may be in the range of approximately 3 to 5 seconds, and the third predetermined time may be approximately within 5 seconds.

Figure 7:
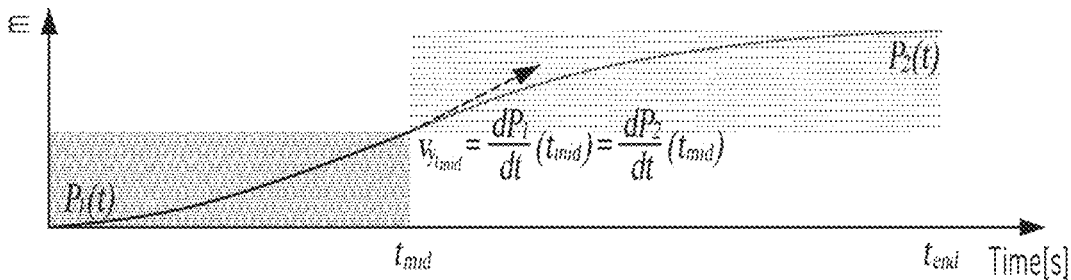
FIG. 7 is a graph for explaining a method for generating a trajectory using a spline in the method for generating the lane changing trajectory according to the embodiment of the present disclosure.

FIG. 7 is a graph for explaining a method for generating a trajectory using a spline in the method for generating the lane changing trajectory according to the embodiment of the present disclosure.

Referring to FIG. 7, the lane changing trajectory according to the present disclosure may be a spline-curve based trajectory. For example, the lane changing trajectory of the present disclosure may be based on a spline curve calculated by two 5th degree polynomials.

Looking more specifically with reference to FIG. 7, the time point at which the midpoint (mid distance point) of the lateral movement distance (the entry point into the neighboring lane) is reached may be set as $t_{mid}$, and the time point at which the lane change is completed may be set as $t_{end}$. Further, the lateral speed of the vehicle at the time point of reaching the midpoint of the lateral movement distance may be represented as $v_{ytmid}$. Here, $t_{mid}$, $t_{end}$, and $v_{ytmid}$ may be tuning parameters. For example, in the embodiment of FIG. 6, it is illustrated that $t_{end}$ is 8 seconds, and $t_{mid}$ is 3 seconds (in case that the initial lateral speed is large according to the trajectory A) or 5 seconds (in case that the initial lateral speed is small according to the trajectory B), and $v_{ytmid}$ is 0.937 m/s.

Here, if the trajectory from the start to $t_{mid}$ which is the time point of reaching the midpoint (the time point of entry into the neighboring lane) is $P_1(t)$, and the trajectory from $t_{mid}$ to $t_{end}$ (the ending time point of lane change) is $P_2(t)$, then each trajectory may be expressed in below two equations.

$$P_1(t) = c_{0,1} + c_{1,1}t + c_{2,1}t^2 + c_{3,1}t^3 + c_{4,1}t^4 + c_{5,1}t^5 = \sum_{i=0}^{5} c_{i,1}t^i$$

$$P_2(t) = c_{0,2} + c_{1,2}t + c_{2,2}t^2 + c_{3,2}t^3 + c_{4,2}t^4 + c_{5,2}t^5 = \sum_{i=0}^{5} c_{i,2}t^i$$

Here, the spline boundary conditions may include the following eight boundary conditions.

$$P_1(0) = c_{0,1} = y_0 \text{(Lateral position at the starting time point)} \quad (1)$$

$$\frac{dP_1}{dt}(0) = c_{1,1} = v_{y_0} \text{(Lateral speed at the starting time point)} \quad (2)$$

$$\frac{d^2P_1}{dt^2}(0) = 2c_{2,1} = a_{y_0} \text{(Lateral acceleration at the starting time point)} \quad (3)$$

$$P_2(t_{end}) = \sum_{i=0}^{5} c_{i,2}t_{end}^i = \quad (4)$$

$$y_{t_{end}} \text{(Lateral position at the ending time point)}$$

$$\frac{dP_2}{dt}(t_{end}) = v_{y_{t_{end}}} = 0 \text{(Lateral speed at the ending time point)} \quad (5)$$

$$\frac{d^2P_2}{dt^2}(t_{end}) = a_{y_{t_{end}}} = 0 \text{(Lateral acceleration at the ending time point)} \quad (6)$$

$$P_1(t_{mid}) = \sum_{i=0}^{5} c_{i,1}t_{mid}^i = \quad (7)$$

$$y_{t_{mid}} \text{(Lateral position at the midpoint reaching time point)}$$

$$\frac{dP_1}{dt}(t_{mid}) = v_{y_{t_{mid}}} \text{(Lateral speed at the midpoint reaching time point)} \quad (8)$$

Further, the spline continuity conditions at the midpoint reaching time point ($t_{mid}$) may include the following four continuity conditions.

$$P_1(t_{mid}) = \quad (i)$$

$$P_2(t_{mid}) \text{(Lateral position continuity equation at the midpoint reaching time point)}$$

$$\frac{dP_1}{dt}(t_{mid}) = \quad (ii)$$

$$\frac{dP_2}{dt}(t_{mid}) \text{(Lateral speed continuity equation at the midpoint reaching time point)}$$

$$\frac{d^2P_1}{dt^2}(t_{mid}) = \quad (iii)$$

$$\frac{d^2P_2}{dt^2}(t_{mid}) \text{(Lateral acceleration continuity equation at the midpoint reaching time point)}$$

$$\frac{d^3P_1}{dt^3}(t_{mid}) = \quad (iv)$$

$$\frac{d^3P_2}{dt^3}(t_{mid}) \text{(Lateral jerk continuity equation at the midpoint reaching time point)}$$

Using the above equations, there can be made 12 simultaneous equations (the spline boundary conditions (1) to (8) and the spline continuity conditions (i) to (iv)) regarding boundary conditions and continuity conditions at the starting time point of the lane change, at the midpoint reaching time point (the time point when entering into the neighboring lane), and at the ending time point of the lane change. Meanwhile, for the two equations of $P_1(t)$ which is the trajectory from the start to the midpoint reaching time point $t_{mid}$, and of $P_2(t)$ which is the trajectory from $t_{mid}$ to $t_{end}$, there are 12 constants (unknowns) ($c_{0,1}$, $c_{1,1}$, $c_{2,1}$, $c_{3,1}$, $c_{4,1}$, $c_{5,1}$, $c_{0,2}$, $c_{1,2}$, $c_{2,2}$, $c_{3,2}$, $c_{4,2}$, $c_{5,2}$), so there are 12 simultaneous equations. By solving the 12 simultaneous equations, two 5th degree polynomials can be solved.

The lane changing trajectory according to the embodiment of the present disclosure may be generated by the spline curve derived by solving the two 5th degree polynomials in this way.

On the other hand, if generating a lane changing trajectory by a conventional method such as a sine wave method, as shown in the prior art described in FIG. 1, each of the graphs illustrating the lateral movement distance, the lateral speed, and the lateral acceleration of the vehicle over time is formed symmetrical around the midpoint.

On the other hand, as in the embodiment of the present disclosure, if the lane changing trajectory is generated based on the spline curve, an asymmetrical graph for each data can be generated, and also, in compliance with the standards of international regulations, a lane changing trajectory may be generated that allows the vehicle to move continuously in the lateral direction from the start to the end of the lane change with completing the lane change within a predetermined time.

That is, while complying with the standards of international regulations regarding the lane changing function, by generating an asymmetrical lane changing trajectory according to the collision risk with peripherals, it is possible to improve the driver's driving responsiveness and operability and increase the driving convenience.

Figure 8:
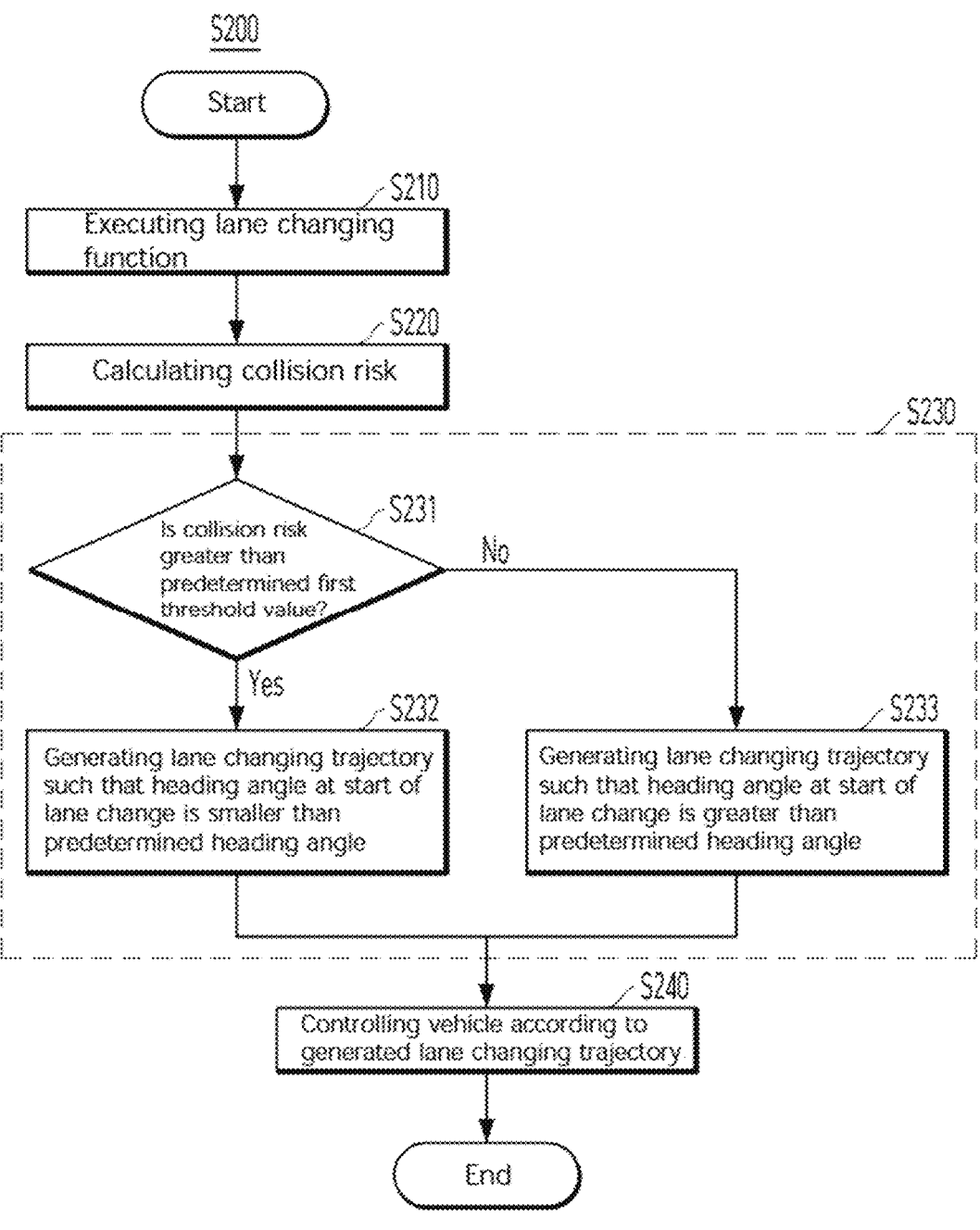
FIG. 8 is a control flowchart of a method for generating a lane changing trajectory of a vehicle according to another embodiment of the present disclosure.

FIG. 8 is a control flowchart of a method for generating a lane changing trajectory of a vehicle according to another embodiment of the present disclosure.

In the lane changing trajectory generation method S200 according to the embodiment of FIG. 8, the lane changing function execution step S210 and the collision risk calculation step S220 may be performed substantially the same as the previous embodiment. On the other hand, the embodiment of FIG. 8 differs from the previous embodiment in the step of generating a lane changing trajectory based on the collision risk S230.

Specifically, according to the embodiment of FIG. 8, it is determined whether the collision risk exceeds a predetermined first threshold value (S231), and if the collision risk exceeds the first threshold value ('Yes' in S231), a lane changing trajectory may be generated so that the vehicle's heading angle at the start of the lane change is smaller than a predetermined heading angle (S232). Meanwhile, if the collision risk does not exceed the first threshold value ('No' in S231), a lane changing trajectory may be generated so that the vehicle's heading angle at the start of the lane change is greater than the predetermined heading angle (S233).

Here, the predetermined heading angle may be an initial heading angle in a lane changing trajectory with a symmetrical graph of the lateral movement distance, the lateral speed, or the lateral acceleration over time, as explained in the previous embodiment.

After the lane changing trajectory is generated as described above, a vehicle control step S240 of controlling the driving of the vehicle according to the generated lane changing trajectory may be performed.

In the embodiments of FIGS. 2 to 4, it is described that the lane changing trajectory is generated by controlling the lateral speed of the vehicle to be increased or decreased, assuming that the longitudinal speed (straight direction speed) of the vehicle is constant. However, the embodiment of FIG. 8 shows a case where the lane changing trajectory is generated by controlling the longitudinal speed and the lateral speed together to increase or decrease the heading angle of the vehicle.

According to the embodiment of FIG. 8, it is determined whether the collision risk exceeds the first threshold value, and the lane changing trajectory may be generated by setting the initial heading angle of the vehicle to be greater than a predetermined heading angle or smaller than the predetermined heading angle depending on the collision risk, thereby controlling the vehicle according to the generated lane changing trajectory.

By controlling in this way, it is possible to promote the driving convenience for the driver when executing the lane changing function and improve the driving responsiveness and operability when changing the lanes.

Figure 9:
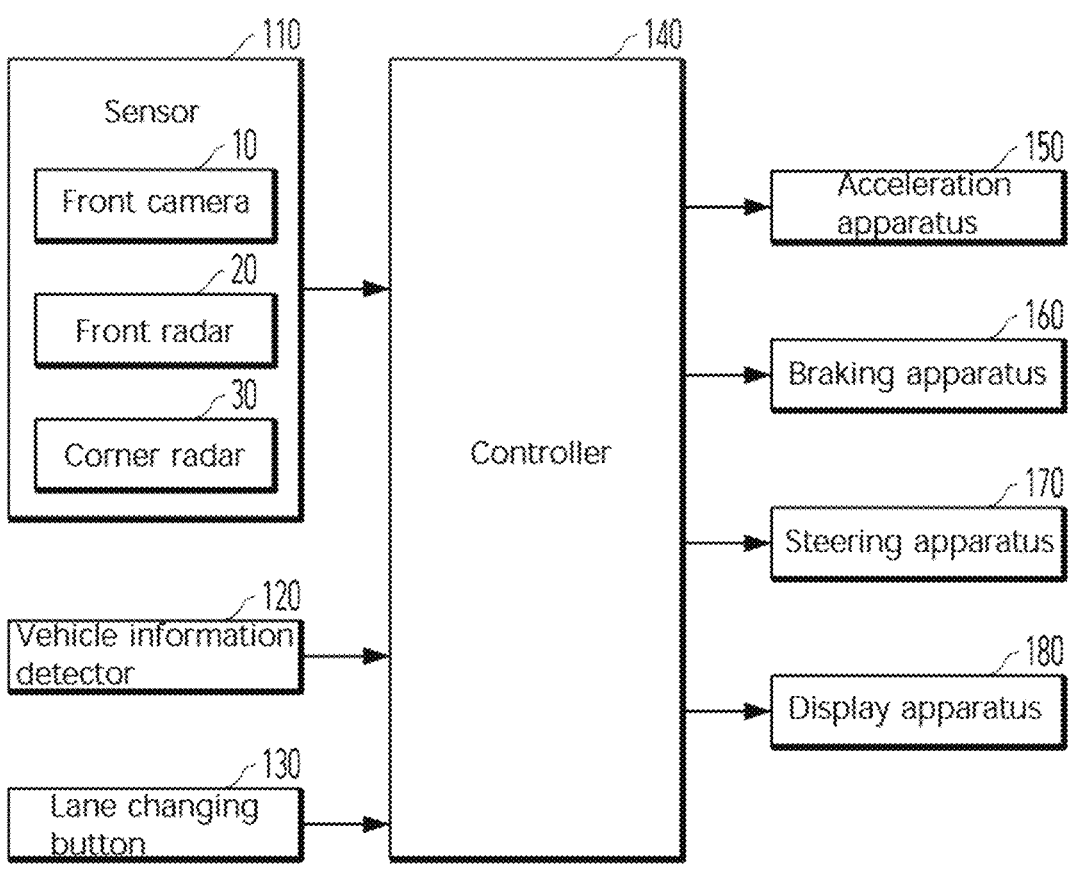
FIG. 9 is a control configuration diagram schematically showing the configuration of a system for generating a lane changing trajectory according to embodiments of the present disclosure.

FIG. 9 is a control configuration diagram schematically showing the configuration of a system for generating a lane changing trajectory according to embodiments of the present disclosure.

Referring to FIG. 9, the system for generating the lane changing trajectory 100 according to the embodiment of the present disclosure may include a sensor 110 for detecting the surroundings of the vehicle, a vehicle information detector 120 for detecting vehicle body information of the vehicle, a lane changing button 130 for executing a lane changing function of the vehicle, and a controller 140 for controlling the vehicle by generating the lane changing trajectory of the vehicle.

The sensor 110 may include at least one of a front camera 10, a front radar 20, or a plurality of corner radars 30 installed at the vehicle. For example, the corner radar 30 may detect rear side vehicles in neighboring lanes.

Meanwhile, the sensor devices included in the sensor 110 are not limited to the above, and the sensor 110 may further include other types of sensor devices for detecting the surroundings of the vehicle, such as lidar sensors and ultrasonic sensors.

The vehicle information detector 120 may detect information about the vehicle, such as the speed of the vehicle, the steering angle, etc. For example, the controller 140 may calculate the collision risk between the driving vehicle and peripherals based on the information detected by the sensor 110 and the information detected by the vehicle information detector 120.

The lane changing button 130 may be installed inside the vehicle, and the driver may execute the lane changing function of the vehicle by operating the lane changing button 130. The lane changing button 130 may be, for example, in the form of a protruding button, but is not limited thereto and may be in the form that can be touched on the display.

When the lane changing button 130 is operated, the controller 140 may calculate the collision risk between the driving vehicle and the peripheral vehicle, and generate lane changing trajectory such that the lateral speed of the vehicle at the start of lane change is changed according to the calculated collision risk.

More specifically, the controller 140 may determine whether the collision risk exceeds a predetermined first threshold value, and if the collision risk exceeds the first threshold value, the controller 140 may generate the lane changing trajectory such that the lateral speed of the vehicle at the start of the lane change is less than a predetermined lateral speed. Meanwhile, if the collision risk is equal to or less than the first threshold value, the controller 140 may generate a lane changing trajectory such that the lateral speed of the vehicle at the start of lane change is greater than the predetermined lateral speed.

Further, the controller 140 may generate a lane changing trajectory such that the lane change is completed within a first predetermined time from the time point of the operating the lane changing button 130. In addition, the controller 140 may generate a lane changing trajectory such that the entry into the neighboring lane begins within a second predetermined time from the time point of the operating the lane changing button 130, and the lane change is completed within a third predetermined time from the beginning of the entry into the neighboring lane.

Since the method by which the controller 140 generates the lane changing trajectory based on the collision risk has been described in detail previously, the detailed description will be omitted here.

In addition, the system for generating the lane changing trajectory 100 according to an embodiment of the present disclosure may include an acceleration apparatus 150 for accelerating the vehicle, a braking apparatus 160 for decelerating or braking the vehicle, a steering apparatus 170 for controlling the driving direction of the vehicle, and a display apparatus 180 for displaying the driving status of the vehicle.

Accordingly, by transmitting the control signal from the controller 140 to the acceleration apparatus 150, the braking apparatus 160, or the steering apparatus 170, it is possible to assist the driving of the driver to perform the lane changing function through acceleration, deceleration, or steering control of the vehicle.

In addition, the display apparatus 180 may display the status of the driver assistance system related to the lane changing function or display a warning to the driver when there is collision risk with peripherals. Alternatively, the generated lane changing trajectory may be displayed on the display apparatus to provide convenience to the driver.

According to the embodiment of the present disclosure as described above, when executing the lane changing function to assist the driving, it is possible to provide convenience and driving stability to the driver by adapting to the surrounding environment and generating an optimal lane changing trajectory.

In addition, according to the method and system for generating the lane changing trajectory according to the embodiment of the present disclosure, when the collision risk with the peripheral is low, it is possible to improve the driving responsiveness and operability by increasing the entry speed. Further, when the collision risk with the peripheral is high (a situation with high uncertainty), it is possible to increase the driving convenience due to the reduction of the lateral movement when canceling the lane change by reducing the lateral speed.

Furthermore, according to the method and system for generating the lane changing trajectory according to the embodiments of the present disclosure, when a peripheral is approaching, by generating a trajectory with a slow entry speed into the neighboring lane, the lane changing intention can be exposed for a long period of time to the peripheral, and the approaching speed of the peripheral can be checked for a long period of time. Therefore, it is possible to clearly understand the intention to yield of the peripheral, thereby helping to determine whether to continue the lane change.

Moreover, according to the embodiments of the present disclosure, in generating a lane changing trajectory, by generating the lane changing trajectory with differentiating the heading angle of the vehicle by controlling the longitudinal speed and the lateral speed together, it is possible to perform the lane changing function smoothly by responding more flexibly to surrounding situations.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Vehicle
2: Peripheral vehicle
10: Front camera
20: Front radar
30: Corner radar
100: System for generating lane changing trajectory
110: Sensor
120: Vehicle information detector
130: Lane changing button
140: Controller
150: Acceleration apparatus
160: Braking apparatus
170: Steering apparatus
180: Display apparatus

What is claimed is:

1. A method for generating a lane changing trajectory of a vehicle, comprising:

executing a lane changing function of the vehicle;

calculating a collision risk with a peripheral vehicle;

generating the lane changing trajectory such that a lateral speed of the vehicle at a start of the lane change changes according to the collision risk, controlling the vehicle to drive along the generated lane changing trajectory, after the generating of the lane changing trajectory, wherein the lane changing trajectory is generated such that, based on a mid time point of the lane change from a starting time point to an ending time point of the lane change, a graph of a lateral speed of the vehicle over time before the mid time point is to be asymmetrical with a graph of a lateral speed of the vehicle over time after the mid time point.

2. The method of claim 1, wherein the generating of the lane changing trajectory further comprises: determining whether the collision risk exceeds a predetermined first threshold value; and if the collision risk exceeds the first threshold value, generating the lane changing trajectory such that the lateral speed of the vehicle at the start of the lane change is smaller than a predetermined lateral speed.

3. The method of claim 2, wherein if the collision risk is equal to or less than the first threshold value, the lane changing trajectory is generated such that the lateral speed of the vehicle at the start of the lane change is greater than the predetermined lateral speed.

4. The method of claim 1, wherein in the generating of the lane changing trajectory, the lane changing trajectory is generated based on a spline curve using two 5th degree polynomials.

5. The method of claim 1, further comprising:

after controlling of the vehicle, recalculating the collision risk with the peripheral vehicle;

generating a lane returning trajectory of the vehicle if the collision risk with the peripheral vehicle exceeds a predetermined second threshold value by comparing the recalculated collision risk with the second threshold value; and controlling the vehicle to return to an existing lane according to the generated lane return returning trajectory.

6. The method of claim 1, wherein the executing of the lane changing function is performed by operating a lane changing button installed at the vehicle, and the lane changing trajectory is generated such that the vehicle moves continuously without stopping in a lateral direction from a time point of operating the lane changing button to a time point when the lane change is completed.

7. The method of claim 6, wherein the generating of the lane changing trajectory comprises generating the lane changing trajectory such that the lane change is completed within a first predetermined time from the time point of operating the lane changing button.

8. The method of claim 7, wherein the generating of the lane changing trajectory comprises generating the lane changing trajectory such that the vehicle overlaps with one lane line of a neighboring lane within a second predetermined time from the time point of operating the lane changing button, and the lane change is completed within a third predetermined time from a time point when the overlapping with the one lane line begins.

9. A system for generating a lane changing trajectory of a vehicle, comprising:

a sensor configured to detect surroundings of the vehicle;

a vehicle information detector configured to detect body information of the vehicle;

a lane changing button configured to execute a lane changing function of the vehicle; and a controller configured to control the vehicle by generating the lane changing trajectory of the vehicle, wherein the controller is configured to calculate a collision risk between the vehicle and a peripheral vehicle when the lane changing button is operated, to generate the lane changing trajectory such that a lateral speed of the vehicle at a start of a lane change changes according to the collision risk, and to control the vehicle to drive along the generated lane changing trajectory, after the generating of the lane changing trajectory, wherein the lane changing trajectory is generated such that, based on a mid time point of the lane change from a starting time point to an ending time point of the lane change, a graph of a lateral speed of the vehicle over time before the mid time point is to be asymmetrical with a graph of a lateral speed of the vehicle over time after the mid time point.

10. The system of claim 9, wherein the controller is configured to determine whether the collision risk exceeds a predetermined first threshold value, and to generate the lane changing trajectory such that the lateral speed of the vehicle at the start of the lane change is smaller than a predetermined lateral speed if the collision risk exceeds the first threshold value.

11. The system of claim 10, wherein the controller is configured to generate the lane changing trajectory such that the lateral speed of the vehicle at the start of the lane change is greater than the predetermined lateral speed if the collision risk is equal to or less than the first threshold value.

12. The system of claim 9, wherein the sensor comprises at least one of a front camera, a front radar, or a corner radar installed at the vehicle.

13. The system of claim 9, wherein the peripheral vehicle is a vehicle approaching from a rear side of a neighboring lane adjacent to a lane in which the vehicle is driving, and the controller is configured to calculate the collision risk between the vehicle and the peripheral vehicle from information obtained by the sensor and the vehicle information detector.

14. The system of claim 9, wherein the controller is configured to generate the lane changing trajectory such that the lane change is completed within a first predetermined time from a time point of operating the lane changing button.

15. The system of claim 9, further comprising an acceleration apparatus, a braking apparatus, and a steering apparatus, wherein the controller is configured to control the vehicle according to the generated lane changing trajectory by controlling at least one of the acceleration apparatus, the braking apparatus, or the steering apparatus.

* * * * *